United States Patent [19]

Synosky et al.

[11] Patent Number: 5,286,500
[45] Date of Patent: Feb. 15, 1994

[54] WAX-FREE CHEWING GUM BASE

[75] Inventors: Steven Synosky, Green Brook, N.J.; Michael A. Reed, Merrillville, Ind.

[73] Assignee: Wm. Wrigley Jr. Company, Chicago, Ill.

[21] Appl. No.: 906,921

[22] Filed: Jun. 30, 1992

Related U.S. Application Data

[63] Continuation-in-part of Ser. No. 1,686, Mar. 3, 1992.

[51] Int. Cl.⁵ .............................................. A23G 3/30
[52] U.S. Cl. ............................................ 426/3; 426/4
[58] Field of Search ........................................ 426/3-6

[56] References Cited

U.S. PATENT DOCUMENTS

| | | | |
|---|---|---|---|
| 3,857,965 | 12/1974 | Ream | 426/3 |
| 3,984,574 | 10/1976 | Comollo | 426/3 |
| 3,995,064 | 11/1976 | Ehrgott et al. | 426/3 |
| 4,064,274 | 12/1977 | Mackay et al. | 426/3 |
| 4,186,214 | 1/1980 | Crouse, III et al. | 426/3 |
| 4,187,320 | 2/1980 | Koch et al. | 426/3 |
| 4,248,894 | 2/1981 | Mackay et al. | 426/4 |
| 4,252,830 | 2/1981 | Kehoe et al. | 426/4 |
| 4,357,355 | 11/1982 | Koch et al. | 426/4 |
| 4,387,108 | 6/1983 | Koch et al. | 426/3 |
| 4,472,437 | 9/1984 | Corsello et al. | 426/3 |
| 4,525,363 | 6/1985 | D'Amelia et al. | 426/3 |
| 4,656,039 | 4/1987 | Weiss et al. | 426/4 |
| 4,721,620 | 1/1988 | Cherukuri et al. | 426/3 |
| 4,794,003 | 12/1988 | Cherukuri et al. | 426/3 |
| 4,872,884 | 10/1989 | Cherukuri et al. | 426/3 |
| 4,889,727 | 12/1989 | Dave et al. | 426/4 |
| 5,023,093 | 6/1991 | Cherukuri et al. | 426/3 |
| 5,039,530 | 8/1991 | Yatka | 426/3 |

FOREIGN PATENT DOCUMENTS 2607671 6/1988 France.

*Primary Examiner*—Jeanette Hunter
*Attorney, Agent, or Firm*—Hill, Steadman & Simpson

[57] ABSTRACT

A chewing gum base is provided which is free of wax as well as a method for producing same. In an embodiment, a wax-free gum base is provided having flavor release characteristics at least as good as similar bases including wax comprising an elastomer, polyvinyl acetate, an elastomer plasticizer, and a sufficient amount of oil to achieve flavor release characteristics that are at least as good as a similar gum base including wax.

30 Claims, No Drawings

WAX-FREE CHEWING GUM BASE

This is a continuation-in-part of U.S. Ser. No. 001,686 filed on Mar. 3, 1992, in the U.S. Receiving Office under the Patent Cooperation Treaty entitled: "IMPROVED WAX-FREE CHEWING GUM BASE" and naming Steven Synosky as the inventor.

FIELD OF THE INVENTION

The present invention relates to improved chewing gum bases of the type which do not contain wax, and to methods of preparing chewing gum bases which do not contain wax.

BACKGROUND OF THE INVENTION

Recently, in the United Kingdom, the use of wax, especially mineral hydrocarbon wax, in gum bases, has come under scrutiny. There is a perception in the United Kingdom that it may not be desirable to use wax in gum bases. This perception could result in possible regulatory issues, in the United Kingdom, concerning the use of wax in gum base.

Unfortunately, one cannot merely remove wax from a gum base without possibly compromising certain desirable characteristics of the resulting chewing gum product. Wax provides a number of functions in the gum base. For example, wax can influence the release of flavor from the gum product. Furthermore, wax aids in the curing of the finished gum product that is made from the gum base. Additionally, wax contributes to the shelf-life of the finished gum and its texture.

Although some gum bases are known that do not contain wax, they, the inventor believes, typically do not have the chew characteristics, in addition to other characteristics, of typical chewing gums that are created from wax containing gum bases. Heretofore, gum bases without wax were not created in response to any regulatory concerns, but rather, were merely created as part of bases to achieve other ends, for example, a non-tack gum. Therefore, in certain instances, compromises with respect to certain characteristics may have been made to achieve other results, e.g., non-tack, reduced calories, etc.

U.S. Pat. No. 3,984,574, issued to Comollo, discloses an abhesive chewing gum base in which the non-tack properties were achieved by eliminating conventional chewing gum base ingredients which were found to contribute to chewing gum tackiness, and by substituting non-tacky ingredients in place of the conventional ingredients. Specifically, it was discovered that three classes of materials account for conventional chewing gum tackiness. These materials are elastomers, resins, and waxes.

Comollo eliminated natural and some synthetic elastomer from the chewing gum base, and substituted in their place one or more non-tacky synthetic elastomers such as polyisobutylene, polyisoprene, isobutylene-isoprene copolymer and butadiene-styrene copolymer. Comollo also eliminated the tack-producing natural resins and modified natural resins and used instead relatively high amounts of hydrogenated or partially hydrogenated vegetable oils or animal fats. Finally, Comollo completely excluded waxes from the gum base, but included polyvinyl acetate, fatty acids, and mono and diglycerides of fatty acids.

There is therefore a need for a method for removing wax from gum bases without compromising the characteristics of the resultant gum. Likewise, there is a need for a gum base not having wax, but exhibiting the characteristics of gum bases that do include wax.

SUMMARY OF THE INVENTION

The present invention is directed to a wax-free chewing gum base and method of making same. The gum base of the invention includes quantities of elastomer (synthetic, natural, or both), elastomer plasticizer, filler and softener, and is substantially free of wax. The gum base of the invention may also contain optional quantities of minor ingredients such as color and antioxidant.

In an embodiment, the use of natural elastomers in the gum base compliments certain chewing gum flavors, such as mint oil, by rounding out the otherwise harsh or grassy notes in the flavor. The presence of natural elastomers and natural resins in the gum base also contributes to improved chewing gum texture and flavor retention. There is currently a need or desire in at least part of the chewing gum industry for gum bases which are devoid of wax and which when used to make chewing gum, exhibit the chew characteristics of a chewing gum made from a wax containing base.

Additionally, the present invention provides a method for eliminating wax from a gum base while retaining the desirable characteristic of a chewing gum having wax. Pursuant to the present invention, a method is provided for eliminating wax from a gum base that includes quantities of an elastomer, elastomer plasticizer, and softener. Pursuant to an embodiment of the method of the present invention, the wax is eliminated from the gum base formula and the oils, that comprise, at least in part, the softener, are increased sufficiently to compensate for the removal of the wax and thereby achieve a gum base that can create a chewing gum having chew properties, including release of flavor, at least as good as gums based on wax bases. It has been found that by selecting the oil content so as to create a gum base that has a lower softening point than a similar gum base containing wax, improved flavor release can be achieved.

In an embodiment, the selection of the elastomer plasticizer, and specifically the melting point of same, is used, at least in part, to compensate for the removal of the wax.

In an embodiment, the oil substantially comprises hydrogenated oils.

In an embodiment, a wax free gum base is provided comprising: an elastomer; polyvinyl acetate; an elastomer plasticizer; and a sufficient amount of oils having melting points between 40° C. to about 70° C. to enhance the flavor release of a gum product made from the base.

In an embodiment, the oils comprise principally hydrogenated oils having melting points of 60°–70° C.

It is an advantage of the invention to provide a substantially wax-free chewing gum base.

It is also an advantage of the invention to provide a suitably soft gum base in which wax is not needed to soften the gum base.

It is also an advantage of the invention to improve the compatibility of gum base ingredients during the blending process, since no wax is present to cause incompatibility.

It is an advantage of the invention to provide an improved chewing gum which contains the wax-free chewing gum base of the invention.

It is also an advantage of the invention to provide an improved chewing gum made from the wax-free base which does not retain the amount of flavor typical sugarless gums retain after chewing.

It is also an advantage of the invention to provide an improved chewing gum that hydrates better during about one to three minutes of chewing.

It is a further advantage of the present invention to provide a method for eliminating wax from a gum base and still provide a gum base that can create a resultant gum product having the characteristics of a gum product that includes wax.

It is an advantage of the present invention to provide a wax free gum base that can be used to create a chewing gum that has chew characteristics at least as good as chewing gum created from wax containing gum bases.

It is an advantage of the present invention to provide a gum base that is free of wax but when used to create a chewing gum has improved flavor release.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

In accordance with the invention, a chewing gum base is provided for use in either non-tack or conventional chewing gum, which may be either bubble gum or regular chewing gum. In an embodiment, the chewing gum base of the invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10-45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is abhesive or conventional, bubble gum or regular gum, as discussed below. The preferred natural elastomers are jelutong, chicle, sorva and massaranduba balata.

Elastomer plasticizers may include, but are not limited to, natural rosin esters such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof. Hydrogenated vegetable oils are generally preferred, either alone or in combination with other softeners. As discussed in detail below, the selection and amount of oils has been determined to, at least with respect to certain bases and at least in part, compensate for the removal of wax.

Colorants and whiteners may include FD&C-type dyes and lakes, fruit and vegetable extracts, titanium dioxide, and combinations thereof.

When the wax-free gum base of the invention is to be used in a regular (non-bubble) gum which has at least some abhesive (reduced tack) characteristics, the base should preferably contain about 10 to about 40 weight percent synthetic elastomer, about 15 to about 30 weight percent elastomer plasticizer, about 5 to about 30 weight percent filler, about 15 to about 35 weight percent softener, 0 to about 1 weight percent colorant and 0 to about 0.1 weight percent antioxidant. By way of example, specific embodiments of the wax-free gum base are provided in Examples 1–30 below.

TABLE 1

WAX-FREE GUM BASES FOR USE IN CHEWING GUM HAVING SOME REDUCED TACK CHARACTERISTICS (EXAMPLES 1-30)

| GENERIC INGREDIENTS | EXAMPLES 1-4 IDENTIFICATION - EXAMPLES #: | | | |
|---|---|---|---|---|
|  | 1 | 2 | 3 | 4 |
| SYNTHETIC ELASTOMER | | | | |
| STYRENE-BUTADIENE ELASTOMER | 5.3 | — | 2.1 | 1.3 |
| BUTYL (ISOPRENE-ISOBUTYLENE) ELASTOMER | 8.6 | 7.9 | 7.2 | 14.8 |
| POLYISOBUTYLENE ELASTOMER | 7.1 | — | 7.4 | 5.2 |
| POLYVINYL ACETATE | 10.5 | 27.2 | 15.3 | 11.7 |
| ELASTOMER PLASTICIZERS | | | | |
| GLYCEROL ESTERS OF ROSIN | 2.1 | — | 19.0 | — |
| GLYCEROL ESTERS OF PART HYD ROSIN | 4.3 | 18.2 | — | 15.3 |

TABLE 1-continued
WAX-FREE GUM BASES FOR USE IN CHEWING GUM
HAVING SOME REDUCED TACK CHARACTERISTICS
(EXAMPLES 1-30)

| | | | | |
|---|---|---|---|---|
| TERPENE RESINS | 10.8 | — | — | — |
| FILLER | | | | |
| CALCIUM CARBONATE | — | 15.9 | 20.7 | — |
| TALC | 25.5 | — | — | 17.1 |
| SOFTENER | | | | |
| HYDROGENATED VEGETABLE OIL | 15.3 | 22.6 | 24.3 | 28.4 |
| GLYCEROL MONOSTEARATE | 8.2 | 7.4 | 4.0 | 5.1 |
| LECITHIN | 2.3 | 0.8 | — | 1.1 |
| TOTAL PERCENT | 100.0 | 100.0 | 100.0 | 100.0 |

EXAMPLES 5-8

| GENERIC INGREDIENTS | IDENTIFICATION - EXAMPLES #: | | | |
|---|---|---|---|---|
| | 5 | 6 | 7 | 8 |
| SYNTHETIC ELASTOMER | | | | |
| STYRENE-BUTADIENE ELASTOMER | 1.8 | — | — | — |
| BUTYL (ISOPRENE-ISOBUTYLENE) ELASTOMER | — | 8.1 | 14.6 | 9.4 |
| POLYISOBUTYLENE ELASTOMER | 24.8 | 3.6 | 1.2 | 13.0 |
| POLYVINYL ACETATE | 10.1 | 27.3 | 26.2 | 22.3 |
| ELASTOMER PLASTICIZERS | | | | |
| GLYCEROL ESTERS OF ROSIN | 3.7 | — | 4.9 | — |
| GLYCEROL ESTERS OF PART HYD ROSIN | 7.9 | — | 12.6 | — |
| TERPENE RESINS | 7.1 | 26.8 | — | 10.0 |
| FILLER | | | | |
| CALCIUM CARBONATE | 17.7 | 11.4 | — | 20.0 |
| TALC | — | — | 13.1 | — |
| SOFTENER | | | | |
| HYDROGENATED VEGETABLE OIL | 21.0 | 14.3 | 16.6 | 20.7 |
| GLYCEROL MONOSTEARATE | 3.5 | 4.8 | 9.6 | 4.6 |
| LECITHIN | 2.4 | 3.7 | 1.2 | — |
| TOTAL PERCENT | 100.0 | 100.0 | 100.0 | 100.0 |

EXAMPLES 9-12

| GENERIC INGREDIENTS | IDENTIFICATION - EXAMPLES #: | | | |
|---|---|---|---|---|
| | 9 | 10 | 11 | 12 |
| SYNTHETIC ELASTOMER | | | | |
| STYRENE-BUTADIENE ELASTOMER | 5.2 | 2.1 | 4.3 | 5.9 |
| BUTYL (ISOPRENE-ISOBUTYLENE) ELASTOMER | 4.1 | 7.2 | 6.2 | 6.9 |
| POLYISOBUTYLENE ELASTOMER | 5.9 | 7.3 | 6.4 | 2.0 |
| POLYVINYL ACETATE | 25.7 | 15.3 | 21.8 | 24.8 |
| ELASTOMER PLASTICIZERS | | | | |
| GLYCEROL ESTERS OF ROSIN | 23.5 | 19.1 | 2.6 | 8.6 |
| GLYCEROL ESTERS OF PART HYD ROSIN | — | — | — | 8.0 |
| TERPENE RESINS | 3.2 | — | 17.1 | 1.9 |
| FILLER | | | | |
| CALCIUM CARBONATE | 15.1 | 20.7 | — | 9.9 |
| TALC | — | — | 14.6 | 7.2 |
| SOFTENER | | | | |
| HYDROGENATED VEGETABLE OIL | 12.2 | 24.3 | 19.5 | 21.1 |
| GLYCEROL MONOSTEARATE | 5.1 | 4.0 | 4.4 | 3.7 |
| LECITHIN | — | — | 3.1 | — |
| TOTAL PERCENT | 100.0 | 100.0 | 100.0 | 100.0 |

EXAMPLES 13-16

| GENERIC INGREDIENTS | IDENTIFICATION - EXAMPLES #: | | | |
|---|---|---|---|---|
| | 13 | 14 | 15 | 16 |
| SYNTHETIC ELASTOMER | | | | |
| STYRENE-BUTADIENE ELASTOMER | 3.9 | — | 2.1 | 1.6 |
| BUTYL (ISOPRENE-ISOBUTYLENE) ELASTOMER | 5.3 | 9.3 | 6.0 | 3.7 |
| POLYISOBUTYLENE ELASTOMER | 12.7 | 12.0 | 8.5 | 6.8 |
| POLYVINYL ACETATE | 14.9 | 21.0 | 15.3 | 22.3 |
| ELASTOMER PLASTICIZERS | | | | |
| GLYCEROL ESTERS OF ROSIN | — | — | 10.1 | 9.9 |
| GLYCEROL ESTERS OF PART HYD ROSIN | — | — | 8.9 | 4.3 |
| TERPENE RESINS | 21.4 | 6.3 | — | 11.6 |
| FILLER | | | | |
| CALCIUM CARBONATE | 13.7 | 21.0 | 20.9 | — |
| TALC | 1.4 | — | — | 17.2 |
| SOFTENER | | | | |
| HYDROGENATED VEGETABLE OIL | 18.7 | 25.0 | 24.2 | 17.8 |
| GLYCEROL MONOSTEARATE | 5.7 | 3.0 | 4.0 | 4.8 |
| LECITHIN | 2.3 | — | — | — |
| TOTAL PERCENT | 100.0 | 100.0 | 100.0 | 100.0 |

EXAMPLES 17-20

| GENERIC INGREDIENTS | IDENTIFICATION - EXAMPLES #: | | | |
|---|---|---|---|---|
| | 17 | 18 | 19 | 20 |
| SYNTHETIC ELASTOMER | | | | |
| STYRENE-BUTADIENE ELASTOMER | — | 2.7 | — | — |
| BUTYL (ISOPRENE-ISOBUTYLENE) ELASTOMER | 8.1 | 2.3 | 8.9 | 3.6 |
| POLYISOBUTYLENE ELASTOMER | 3.6 | 14.2 | 10.0 | 11.1 |
| POLYVINYL ACETATE | 27.3 | 17.3 | 21.3 | 21.9 |
| ELASTOMER PLASTICIZERS | | | | |
| GLYCEROL ESTERS OF ROSIN | — | — | — | 19.6 |
| GLYCEROL ESTERS OF PART HYD ROSIN | — | 27.3 | — | 11.2 |
| TERPENE RESINS | 26.9 | — | 9.7 | 3.7 |
| FILLER | | | | |
| CALCIUM CARBONATE | 11.3 | — | 21.5 | 6.4 |
| TALC | — | 8.2 | — | — |
| SOFTENER | | | | |
| HYDROGENATED VEGETABLE OIL | 14.3 | 22.4 | 23.2 | 19.2 |
| GLYCEROL MONOSTEARATE | 4.8 | 2.7 | 5.4 | 3.3 |
| LECITHIN | 3.7 | 2.9 | — | — |
| TOTAL PERCENT | 100.0 | 100.0 | 100.0 | 100.0 |

EXAMPLES 21-24

| GENERIC INGREDIENTS | IDENTIFICATION - EXAMPLES #: | | | |
|---|---|---|---|---|
| | 21 | 22 | 23 | 24 |
| SYNTHETIC ELASTOMER | | | | |
| STYRENE-BUTADIENE ELASTOMER | — | 1.4 | 3.2 | — |
| BUTYL (ISOPRENE-ISOBUTYLENE) ELASTOMER | 7.4 | 8.4 | 7.3 | 8.8 |
| POLYISOBUTYLENE ELASTOMER | 1.9 | 1.6 | 7.5 | 3.5 |
| POLYVINYL ACETATE | 24.8 | 23.1 | 21.1 | 27.9 |
| ELASTOMER PLASTICIZERS | | | | |
| GLYCEROL ESTERS OF ROSIN | — | 13.1 | 15.3 | — |
| GLYCEROL ESTERS OF PART HYD ROSIN | — | 22.1 | 2.4 | — |
| TERPENE RESINS | 25.8 | 3.6 | 5.8 | 27.4 |
| FILLER | | | | |
| CALCIUM CARBONATE | 18.6 | — | — | 11.9 |
| TALC | — | 7.3 | 14.8 | — |
| SOFTENER | | | | |
| HYDROGENATED VEGETABLE OIL | 12.3 | 11.3 | 19.8 | 12.3 |
| GLYCEROL MONOSTEARATE | 4.4 | 4.4 | 2.8 | 4.7 |
| LECITHIN | 4.8 | 3.7 | — | 3.5 |
| TOTAL PERCENT | 100.0 | 100.0 | 100.0 | 100.0 |

EXAMPLES 25-28

IDENTIFICATION -

TABLE 1-continued
WAX-FREE GUM BASES FOR USE IN CHEWING GUM HAVING SOME REDUCED TACK CHARACTERISTICS (EXAMPLES 1-30)

| GENERIC INGREDIENTS | 25 | 26 | 27 | 28 |
|---|---|---|---|---|
| SYNTHETIC ELASTOMER | | | | |
| STYRENE-BUTADIENE ELASTOMER | 4.1 | — | — | — |
| BUTYL (ISOPRENE-ISOBUTYLENE) ELASTOMER | 11.3 | 10.0 | 9.2 | 2.4 |
| POLYISOBUTYLENE ELASTOMER | 7.9 | 1.9 | 6.3 | 8.4 |
| POLYVINYL ACETATE | 18.2 | 27.6 | 13.1 | 20.5 |
| ELASTOMER PLASTICIZERS | | | | |
| GLYCEROL ESTERS OF ROSIN | — | — | — | — |
| GLYCEROL ESTERS OF PART HYD ROSIN | 26.2 | — | 19.9 | — |
| TERPENE RESINS | 1.4 | 25.3 | — | 23.5 |
| FILLER | | | | |
| CALCIUM CARBONATE | 13.6 | 11.3 | 22.3 | — |
| TALC | — | — | — | 15.6 |
| SOFTENER | | | | |
| HYDROGENATED VEGETABLE OIL | 8.2 | 15.4 | 18.6 | 19.2 |
| GLYCEROL MONOSTEARATE | 5.2 | 4.8 | 10.6 | 8.9 |
| LECITHIN | 3.9 | 3.7 | — | 1.5 |
| TOTAL PERCENT | 100.0 | 100.0 | 100.0 | 100.0 |

EXAMPLES 29-30

| GENERIC INGREDIENTS | 29 | 30 |
|---|---|---|
| SYNTHETIC ELASTOMER | | |
| STYRENE-BUTADIENE ELASTOMER | — | — |
| BUTYL (ISOPRENE-ISOBUTYLENE) ELASTOMER | 8.3 | 8.8 |
| POLYISOBUTYLENE ELASTOMER | 3.6 | 2.3 |
| POLYVINYL ACETATE | 27.5 | 27.4 |
| ELASTOMER PLASTICIZERS | | |
| GLYCEROL ESTERS OF ROSIN | — | — |
| GLYCEROL ESTERS OF PART HYD ROSIN | — | — |
| TERPENE RESINS | 25.3 | 28.3 |
| FILLER | | |
| CALCIUM CARBONATE | 11.3 | 12.5 |
| TALC | — | — |
| SOFTENER | | |
| HYDROGENATED VEGETABLE OIL | 16.5 | 12.5 |
| GLYCEROL MONOSTEARATE | 4.8 | 4.7 |
| LECITHIN | 2.7 | 3.5 |
| TOTAL PERCENT | 100.0 | 100.0 |

When the wax-free gum base of the invention is to be used in a regular (non-bubble) gum which does not have abhesive characteristics, the base should preferably contain about 12 to about 30 weight percent natural elastomer, about 20 to about 40 weight percent synthetic elastomer, about 4 to about 25 weight percent elastomer plasticizer, about 5 to about 25 weight percent filler, about 15 to about 30 weight percent softener, 0 to about 0.1 weight percent colorant and 0 to about 0.1 weight percent antioxidant. By way of example, specific embodiments of the wax-free gum base fitting this description are provided in Examples 31-55 below:

TABLE 2
WAX-FREE GUM BASES FOR USE IN CHEWING GUM HAVING SOME REDUCED TACK CHARACTERISTICS (EXAMPLES 31-55)

EXAMPLES 31-34

| GENERIC INGREDIENTS | 31 | 32 | 33 | 34 |
|---|---|---|---|---|
| NATURAL ELASTOMER | | | | |
| NATURAL GUM | 22.0 | 26.5 | 23.4 | 25.1 |
| SYNTHETIC ELASTOMER | | | | |
| STYRENE-BUTADIENE ELASTOMER | — | — | — | 1.9 |
| BUTYL (ISOPRENE-ISOBUTYLENE) ELASTOMER | 4.8 | 7.1 | 5.6 | 2.1 |
| POLYISOBUTYLENE ELASTOMER | 5.7 | 5.6 | 3.0 | 4.7 |
| POLYVINYL ACETATE | 16.4 | 18.7 | 19.8 | 24.8 |
| ELASTOMER PLASTICIZERS | | | | |
| GLYCEROL ESTERS OF ROSIN | 3.8 | — | — | 3.2 |
| GLYCEROL ESTERS OF PART HYD ROSIN | 12.3 | 15.3 | 15.9 | 12.6 |
| METHYL ESTERS OF ROSIN | — | — | — | 2.1 |
| TERPENE RESINS | — | — | — | — |
| FILLER | | | | |
| CALCIUM CARBONATE | — | 4.0 | 10.7 | 4.4 |
| TALC | 7.1 | — | — | — |
| SOFTENER | | | | |
| HYDROGENATED VEGETABLE OIL | 21.8 | 18.4 | 16.8 | 12.6 |
| GLYCEROL MONOSTEARATE | 6.1 | 4.4 | 4.8 | 3.8 |
| LECITHIN | — | — | — | 2.7 |
| TOTAL PERCENT | 100.0 | 100.0 | 100.0 | 100.0 |

EXAMPLES 35-38

| GENERIC INGREDIENTS | 35 | 36 | 37 | 38 |
|---|---|---|---|---|
| NATURAL ELASTOMER | | | | |
| NATURAL GUM | 22.8 | 18.2 | 23.5 | 17.6 |
| SYNTHETIC ELASTOMER | | | | |
| STYRENE-BUTADIENE ELASTOMER | 2.6 | — | — | — |
| BUTYL (ISOPRENE-ISOBUTYLENE) ELASTOMER | 4.1 | 6.9 | 8.8 | 10.2 |
| POLYISOBUTYLENE ELASTOMER | 3.2 | 5.4 | 3.3 | 2.1 |
| POLYVINYL ACETATE | 16.3 | 15.2 | 12.9 | 26.9 |
| ELASTOMER PLASTICIZERS | | | | |
| GLYCEROL ESTERS OF ROSIN | 6.9 | — | 8.65 | 11.7 |
| GLYCEROL ESTERS OF PART HYD ROSIN | 11.8 | 12.5 | 5.5 | 4.8 |
| METHYL ESTERS OF ROSIN | 1.7 | 2.6 | 1.4 | — |
| TERPENE RESINS | — | — | 3.7 | — |
| FILLER | | | | |
| CALCIUM CARBONATE | 9.3 | 16.0 | — | — |
| TALC | — | — | 9.3 | 4.6 |
| SOFTENER | | | | |
| HYDROGENATED VEGETABLE OIL | 18.2 | 16.1 | 16.2 | 15.8 |
| GLYCEROL MONOSTEARATE | — | 7.1 | 5.7 | 6.3 |
| LECITHIN | 3.1 | — | 1.2 | — |
| TOTAL PERCENT | 100.0 | 100.0 | 100.0 | 100.0 |

EXAMPLES 39-42

| GENERIC INGREDIENTS | 39 | 40 | 41 | 42 |
|---|---|---|---|---|
| NATURAL ELASTOMER | | | | |
| NATURAL GUM | 12.9 | 18.5 | 15.7 | 22.6 |
| SYNTHETIC ELASTOMER | | | | |
| STYRENE-BUTADIENE ELASTOMER | — | — | 1.9 | — |
| BUTYL (ISOPRENE-ISOBUTYLENE) ELASTOMER | 9.1 | 6.4 | 3.7 | 5.8 |
| POLYISOBUTYLENE ELASTOMER | 9.4 | 5.2 | 4.1 | 3.1 |
| POLYVINYL ACETATE | 10.7 | 15.4 | 26.2 | 20.4 |
| ELASTOMER PLASTICIZERS | | | | |

TABLE 2-continued
WAX-FREE GUM BASES FOR USE IN CHEWING GUM HAVING SOME REDUCED TACK CHARACTERISTICS (EXAMPLES 31-55)

| | | | | |
|---|---|---|---|---|
| GLYCEROL ESTERS OF ROSIN | 15.2 | — | — | — |
| GLYCEROL ESTERS OF PART HYD ROSIN | — | 13.2 | 15.3 | 11.7 |
| METHYL ESTERS OF ROSIN | — | 2.0 | — | 4.0 |
| TERPENE RESINS | — | — | — | — |
| FILLER | | | | |
| CALCIUM CARBONATE | 20.6 | 18.5 | 12.2 | 11.6 |
| TALC | — | — | — | — |
| SOFTENER | | | | |
| HYDROGENATED VEGETABLE OIL | 15.8 | 13.9 | 15.1 | 17.5 |
| GLYCEROL MONOSTEARATE | 6.3 | 6.9 | 5.8 | 3.3 |
| LECITHIN | — | — | — | — |
| TOTAL PERCENT | 100.0 | 100.0 | 100.0 | 100.0 |

EXAMPLES 43-46

| GENERIC INGREDIENTS | IDENTIFICATION - EXAMPLES #: | | | |
|---|---|---|---|---|
| | 43 | 44 | 45 | 46 |
| NATURAL ELASTOMER | | | | |
| NATURAL GUM | 23.7 | 22.2 | 21.1 | 22.2 |
| SYNTHETIC ELASTOMER | | | | |
| STYRENE-BUTADIENE ELASTOMER | — | — | — | — |
| BUTYL (ISOPRENE-ISOBUTYLENE) ELASTOMER | 6.2 | 5.7 | 6.1 | 5.7 |
| POLYISOBUTYLENE ELASTOMER | 5.9 | 3.1 | 2.8 | 3.1 |
| POLYVINYL ACETATE | 23.7 | 22.0 | 18.0 | 22.0 |
| ELASTOMER PLASTICIZERS | | | | |
| GLYCEROL ESTERS OF ROSIN | — | — | 15.7 | — |
| GLYCEROL ESTERS OF PART HYD ROSIN | 11.3 | 15.2 | — | 13.2 |
| METHYL ESTERS OF ROSIN | 2.9 | — | — | 2.0 |
| TERPENE RESINS | 2.8 | — | — | — |
| FILLER | | | | |
| CALCIUM CARBONATE | 5.6 | 11.4 | — | 11.3 |
| TALC | — | — | 15.4 | — |
| SOFTENER | | | | |
| HYDROGENATED VEGETABLE OIL | 12.1 | 17.2 | 15.1 | 17.2 |
| GLYCEROL MONOSTEARATE | 5.8 | 3.3 | 5.8 | 3.3 |
| LECITHIN | — | — | — | — |
| TOTAL PERCENT | 100.0 | 100.0 | 100.0 | 100.0 |

EXAMPLES 47-50

| GENERIC INGREDIENTS | IDENTIFICATION - EXAMPLES #: | | | |
|---|---|---|---|---|
| | 47 | 48 | 49 | 50 |
| NATURAL ELASTOMER | | | | |
| NATURAL GUM | 23.8 | 28.4 | 18.7 | 19.5 |
| SYNTHETIC ELASTOMER | | | | |
| STYRENE-BUTADIENE ELASTOMER | — | — | — | — |
| BUTYL (ISOPRENE-ISOBUTYLENE) ELASTOMER | 3.1 | 5.4 | 6.0 | 8.2 |
| POLYISOBUTYLENE ELASTOMER | 7.7 | 3.1 | 5.5 | 2.7 |
| POLYVINYL ACETATE | 20.5 | 26.6 | 14.8 | 17.2 |
| ELASTOMER PLASTICIZERS | | | | |
| GLYCEROL ESTERS OF ROSIN | — | — | — | 20.0 |
| GLYCEROL ESTERS OF PART HYD ROSIN | 10.4 | 11.4 | 15.5 | — |
| METHYL ESTERS OF ROSIN | 2.0 | — | — | — |
| TERPENE RESINS | 5.1 | — | — | — |
| FILLER | | | | |
| CALCIUM CARBONATE | — | 9.1 | 17.9 | 9.6 |
| TALC | 5.3 | — | — | — |
| SOFTENER | | | | |
| HYDROGENATED VEGETABLE OIL | 15.8 | 16.0 | 13.0 | 22.8 |
| GLYCEROL MONOSTEARATE | 6.3 | — | 7.7 | — |
| LECITHIN | — | — | — | — |
| TOTAL PERCENT | 100.0 | 100.0 | 100.0 | 100.0 |

EXAMPLES 51-54

| GENERIC INGREDIENTS | IDENTIFICATION - EXAMPLES #: | | | |
|---|---|---|---|---|
| | 51 | 52 | 53 | 54 |
| NATURAL ELASTOMER | | | | |
| NATURAL GUM | 14.4 | 18.2 | 25.2 | 25.2 |
| SYNTHETIC ELASTOMER | | | | |
| STYRENE-BUTADIENE ELASTOMER | — | — | — | — |
| BUTYL (ISOPRENE-ISOBUTYLENE) ELASTOMER | 9.1 | 6.8 | 2.4 | 3.5 |
| POLYISOBUTYLENE ELASTOMER | 3.6 | 5.4 | 4.9 | 5.7 |
| POLYVINYL ACETATE | 18.1 | 15.5 | 19.9 | 19.1 |
| ELASTOMER PLASTICIZERS | | | | |
| GLYCEROL ESTERS OF ROSIN | 11.9 | — | 15.6 | — |
| GLYCEROL ESTERS OF PART HYD ROSIN | 13.0 | 12.7 | — | 15.6 |
| METHYL ESTERS OF ROSIN | — | 2.6 | — | — |
| TERPENE RESINS | — | — | 2.1 | 1.9 |
| FILLER | | | | |
| CALCIUM CARBONATE | 14.1 | 15.7 | — | — |
| TALC | — | — | 7.1 | 6.2 |
| SOFTENER | | | | |
| HYDROGENATED VEGETABLE OIL | 15.8 | 16.0 | 18.4 | 18.4 |
| GLYCEROL MONOSTEARATE | — | 7.1 | 4.4 | 4.4 |
| LECITHIN | — | — | — | — |
| TOTAL PERCENT | 100.0 | 100.0 | 100.0 | 100.0 |

EXAMPLE 55

| GENERIC INGREDIENTS | IDENTIFICATION - EXAMPLES #: |
|---|---|
| | 55 |
| NATURAL ELASTOMER | |
| NATURAL GUM | 26.7 |
| SYNTHETIC ELASTOMER | |
| STYRENE-BUTADIENE ELASTOMER | — |
| BUTYL (ISOPRENE-ISOBUTYLENE) ELASTOMER | 3.2 |
| POLYISOBUTYLENE ELASTOMER | 6.1 |
| POLYVINYL ACETATE | 17.6 |
| ELASTOMER PLASTICIZERS | |
| GLYCEROL ESTERS OF ROSIN | — |
| GLYCEROL ESTERS OF PART HYD ROSIN | 15.6 |
| METHYL ESTERS OF ROSIN | — |
| TERPENE RESINS | — |
| FILLER | |
| CALCIUM CARBONATE | — |
| TALC | 8.0 |
| SOFTENER | |
| HYDROGENATED VEGETABLE OIL | 18.4 |
| GLYCEROL MONOSTEARATE | 2.8 |
| LECITHIN | 1.6 |
| TOTAL PERCENT | 100.0 |

When the wax-free gum base of the invention is to be used in a bubble gum, the base should preferably contain about 30 to about 60 weight percent synthetic elastomer, about 5 to about 55 weight percent elastomer plasticizer, about 10 to about 35 weight percent filler, about 5 to about 25 weight percent softener, 0 to about 1 weight percent colorant and 0 to about 0.1 weight percent antioxidant. By way of examples, specific embodiments of the wax-free base for use in bubble gum are provided in Examples 56-74 below.

TABLE 3
WAX-FREE GUM BASES FOR USE IN BUBBLE GUM (EXAMPLES 56-74)

| GENERIC INGREDIENTS | IDENTIFICATION - EXAMPLES #: | | | |
|---|---|---|---|---|
| | 56 | 57 | 58 | 59 |
| SYNTHETIC ELASTOMER | | | | |
| POLYISOBUTYLENE ELASTOMER | 17.1 | 16.7 | 11.7 | 6.2 |
| POLYVINYL ACETATE | 24.9 | 25.6 | 29.4 | 30.9 |
| ELASTOMER PLASTICIZERS | | | | |
| GLYCEROL ESTERS OF ROSIN | 6.8 | 8.0 | 10.7 | 14.6 |
| GLYCEROL ESTERS OF PART HYD ROSIN | — | — | — | — |
| FILLER | | | | |
| CALCIUM CARBONATE | — | — | — | — |
| TALC | 34.7 | 34.9 | 34.1 | 34.0 |
| SOFTENER | | | | |
| GLYCEROL TRIACETATE | 4.6 | 3.9 | 4.4 | 4.7 |
| GLYCEROL MONOSTEARATE | 5.8 | 5.7 | 4.3 | 4.6 |
| ACETYLATED MONOGLYCERIDE | 6.1 | 5.2 | 5.4 | 5.0 |
| TOTAL PERCENT | 100.0 | 100.0 | 100.0 | 100.0 |

EXAMPLES 60-63

| GENERIC INGREDIENTS | IDENTIFICATION - EXAMPLES #: | | | |
|---|---|---|---|---|
| | 60 | 61 | 62 | 63 |
| SYNTHETIC ELASTOMER | | | | |
| POLYISOBUTYLENE ELASTOMER | 11.6 | 15.7 | 13.2 | 5.4 |
| POLYVINYL ACETATE | 31.5 | 32.1 | 33.2 | 34.8 |
| ELASTOMER PLASTICIZERS | | | | |
| GLYCEROL ESTERS OF ROSIN | 19.8 | 27.4 | 22.6 | 16.3 |
| GLYCEROL ESTERS OF PART HYD ROSIN | — | — | — | — |
| FILLER | | | | |
| CALCIUM CARBONATE | — | — | — | 30.2 |
| TALC | 21.9 | 10.1 | 17.3 | — |
| SOFTENER | | | | |
| GLYCEROL TRIACETATE | 5.0 | 4.9 | 5.0 | 5.3 |
| GLYCEROL MONOSTEARATE | 4.9 | 4.7 | 4.1 | 5.9 |
| ACETYLATED MONOGLYCERIDE | 5.3 | 5.1 | 4.6 | 2.1 |
| TOTAL PERCENT | 100.0 | 100.0 | 100.0 | 100.0 |

EXAMPLES 64-67

| GENERIC INGREDIENTS | IDENTIFICATION - EXAMPLES #: | | | |
|---|---|---|---|---|
| | 64 | 65 | 66 | 67 |
| SYNTHETIC ELASTOMER | | | | |
| POLYISOBUTYLENE ELASTOMER | 7.9 | 17.2 | 13.0 | 11.6 |
| POLYVINYL ACETATE | 34.2 | 37.3 | 37.1 | 39.9 |
| ELASTOMER PLASTICIZERS | | | | |
| GLYCEROL ESTERS OF ROSIN | 14.8 | 11.2 | — | — |
| GLYCEROL ESTERS OF PART HYD ROSIN | — | — | 19.8 | 19.9 |
| FILLER | | | | |
| CALCIUM CARBONATE | 29.8 | 20.6 | 16.5 | 15.0 |
| TALC | — | — | — | — |
| SOFTENER | | | | |
| GLYCEROL TRIACETATE | 5.3 | 5.6 | 5.6 | 6.0 |
| GLYCEROL MONOSTEARATE | 5.0 | 8.1 | 8.0 | 7.6 |
| ACETYLATED MONOGLYCERIDE | 3.0 | — | — | — |
| TOTAL PERCENT | 100.0 | 100.0 | 100.0 | 100.0 |

EXAMPLES 68-71

| GENERIC INGREDIENTS | IDENTIFICATION - EXAMPLES #: | | | |
|---|---|---|---|---|
| | 68 | 69 | 70 | 71 |
| SYNTHETIC ELASTOMER | | | | |
| POLYISOBUTYLENE ELASTOMER | 11.6 | 7.9 | 11.6 | 10.9 |
| POLYVINYL ACETATE | 41.2 | 34.2 | 37.8 | 37.5 |
| ELASTOMER PLASTICIZERS | | | | |
| GLYCEROL ESTERS OF ROSIN | — | — | — | — |
| GLYCEROL ESTERS OF PART HYD ROSIN | 19.4 | 14.8 | 19.8 | 20.6 |
| FILLER | | | | |
| CALCIUM CARBONATE | — | 29.8 | — | — |
| TALC | 14.0 | — | 17.0 | 19.5 |
| SOFTENER | | | | |
| GLYCEROL TRIACETATE | 6.2 | 5.3 | 5.6 | 5.2 |
| GLYCEROL MONOSTEARATE | 7.6 | 5.0 | 3.2 | 3.1 |
| ACETYLATED MONOGLYCERIDE | — | 3.0 | 5.0 | 3.2 |
| TOTAL PERCENT | 100.0 | 100.0 | 100.0 | 100.0 |

EXAMPLES 72-74

| GENERIC INGREDIENTS | IDENTIFICATION - EXAMPLES #: | | |
|---|---|---|---|
| | 72 | 73 | 74 |
| SYNTHETIC ELASTOMER | | | |
| POLYISOBUTYLENE ELASTOMER | 11.6 | 11.8 | 11.9 |
| POLYVINYL ACETATE | 33.5 | 35.6 | 37.0 |
| ELASTOMER PLASTICIZERS | | | |
| GLYCEROL ESTERS OF ROSIN | — | — | — |
| GLYCEROL ESTERS OF PART HYD ROSIN | 19.8 | 19.8 | 20.3 |
| FILLER | | | |
| CALCIUM CARBONATE | — | — | — |
| TALC | 21.9 | 19.7 | 16.7 |
| SOFTENER | | | |
| GLYCEROL TRIACETATE | 5.0 | 4.3 | 5.7 |
| GLYCEROL MONOSTEARATE | 2.9 | 2.3 | 4.5 |
| ACETYLATED MONOGLYCERIDE | 5.3 | 6.5 | 3.9 |
| TOTAL PERCENT | 100.0 | 100.0 | 100.0 |

The wax-free gum base of the invention constitutes about 5-95 weight percent of the chewing gum, more typically 10-50 weight percent of the chewing gum, and most commonly 20-35 weight percent of the chewing gum. The gum base is typically prepared by adding an amount of the elastomer, elastomer plasticizers and filler to a heated sigma blade mixer with a front to rear blade speed ratio of typically 2:1. The initial amounts of ingredients are determined by the working capacity of the mixing kettle in order to attain a proper consistency. After the initial ingredients have massed homogeneously, the balance of the elastomer plasticizer, filler, softeners, etc. are added in a sequential manner until a completely homogeneous molten mass is attained. This can usually be achieved in one to four hours, depending on the formulation. The final mass temperature can be between 60° C. and 150° C., more preferably between 80° C. and 120° C. The completed molten mass is emptied from the mixing kettle into coated or lined pans, extruded or cast into any desirable shape and allowed to cool and solidify.

Although the above method for making base is typical and applies to both chewing and bubble bases, it has been found that there is a preferred method for making the bubble bases described in this invention.

First, all of the polyvinyl acetate and portions of the polyisobutylene and filler are added and blended in a heated sigma blade mixer. Softeners such as glyceryl triacetate and/or acetylated monoglyceride are then added along with a second portion of each of polyisobutylene and filler. The acetylated monoglyceride may be added at the end of the process if desired and still not alter the chewing texture of the gum made from the base.

Next, the rest of the polyisobutylene and filler are added along with the elastomer plasticizer. Finally, the remaining ingredients such as glycerol monostearate and antioxidants may be added. Colorant may be added at any time during the mixing process and is preferably added at the start.

There are some variations to the above described preferred method which in no way limit the method as described. Those skilled in the art of gum base manufacture may be able to appreciate any minor variations.

In producing wax-containing gum bases high in polyvinyl acetate, and particularly those high in high molecular weight polyvinyl acetate, it is necessary to improve blending of the ingredients by removing the heat applied to the sigma blade mixer at some point in the process. This reduces the temperature of the gum base and causes greater compatibility of its ingredients. In the inventive gum base process for making the inventive gum base free of wax, there is no need to remove the heat applied. The degree of incompatibility is greatly reduced since there is no wax present.

In addition to the water-insoluble gum base, a typical chewing gum composition includes a water soluble bulk portion and one or more flavoring agents. The wax-free gum base of the invention can be used with any typical chewing gum composition.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5-15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5-95% by weight of the chewing gum, more typically 20-80% by weight of the chewing gum and most commonly 30-60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners may also be present and are commonly used with sugarless sweeteners. When used, high intensity sweeteners typically constitute between 0.001-5% by weight of the chewing gum, preferably between 0.01-1% by weight of the chewing gum. Typically, high intensity sweeteners are at least 20-times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

Flavoring agents should generally be present in the chewing gum in an amount within the range of about 0.1-15% by weight of the chewing gum, preferably between about 0.2-5% by weight of the chewing gum, most preferably between about 0.5-3% by weight of the chewing gum. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

Pursuant to the present invention, methods are provided for eliminating the wax from a gum base yet still providing a gum base that yields a gum having desirable characteristics. Of course, a great number of gum bases are known, many of which have been, or are, commercial products. The inventor believes that the great majority of these bases are wax containing. Indeed, it is further believed that there are only a few specialized formulas that do not contain wax; these formulas having been modified to achieve certain properties at the expense of certain desirable properties that are typically present in a wax containing gum and therefore do not provide a wax-free gum base that can be used to create a gum having characteristics as good as or better than a gum including wax. It would therefore be desirable to provide a method for creating a wax free product in those situations where public perception or regulatory requirements make a wax-free base necessary and/or desirable.

The inventor has found that one method for eliminating wax from a gum base is to eliminate the wax from the typical formula and increase the proportion of at least select oils in the base sufficiently to compensate for the removal of the wax. It is not necessary for a one to one correspondence to be made with respect to the amount of wax deleted and the proportion of oil increased. Rather, in order to afford the necessary characteristics to the resultant gum, the amount and type of oils chosen are selected to create a composition that has chew characteristics, including flavor release, as good as a wax based gum.

More specifically, in an embodiment of the method and composition of the present invention, the amount of and the capillary melting point (CMP) of the oil component are chosen so that the resultant no wax gum base has a softening point lower than that of a corresponding wax containing gum base. The softening point of the base is determined by using ASTM method E28-58T modified whereby the gum base sample is softened in an oven and molded into a shouldered brass ring and trimmed. The sample is placed in a water and glycerine bath and adjusted to a temperature rise of 1° C. ±0.25° C. per minute.

By so choosing the oils and reducing the softening point of the base, this provides for a better release of the flavors. It has been found that preferably the oils have a CMP of approximately 40° C. to about 70° C. Preferably, the oils comprise substantially hydrogenated oils. Preferred hydrogenated oils include cottonseed oil (60°-65° C.) and soybean oil (65°-70° C.). However, other oils can also be used such as canola, safflower, sunflower, palm, and coconut. It has been found that preferably when hydrogenated oils are used, the oils comprise at least 12% by weight of the gum base.

Partially hydrogenated oils can be used in conjunction with the hydrogenated oils. Preferably, the partially hydrogenated oils have melting points of 45°-50° C. In an embodiment, preferably the partially hydrogenated oils are used at 10% or less with respect to the total content of the base.

As used herein, the term "oil" is used broadly and includes hydrogenated oils and those products that technically may be classified as fats.

Additionally, it has been found that the selection of the elastomer plasticizer can contribute and improve the characteristics of a gum base product when the wax is removed. In this regard, the ring and ball softening points (R&B SP) of the elastomer plasticizer may also be important with respect to a no wax product. Preferably, in an embodiment of the no wax gum base of the present invention, the elastomer plasticizer has a R&B SP of about 60° C. to about 135° C. Such elastomer plasticizers include: dimerized rosin ester (80°-130° C.); glycerol ester of rosin (80°-90° C.); glycerol ester of partially hydrogenated rosin (75°-90° C.); and terpene resin (80°-130° C.).

Pursuant to the present invention, a method is provided for removing the wax from a typical wax containing gum base formula. To this end, in an embodiment, when the gum base from which the wax is to be removed originally contains approximately 5% or less wax, in the initial step in the process, the wax is removed from the formula and the other components are increased proportionately. It is not necessary that each component be increased, or that each component be increased to the exact same extent. Rather, at least the majority of the components are increased, and preferably proportionately.

After the reformulation of the gum base, the resultant gum base is then tested. To this end, the gum base can be tested to determine its physical properties, e.g., rheology, to determine if those properties are at least substantially similar to the original wax containing gum base. If desired, the gum base can be used to create a chewing gum. The chewing gum can then be tested to determine if it has chew characteristics that are sufficiently close to, if not better, than a control (a gum created from the original gum base containing wax).

If it is found that the resultant gum does not have sufficiently good chew characteristics, or if the physical properties of the gum base are not satisfactory, then the percent of oil in the gum base is modified. In an embodiment, the percent of oil is not initially modified, but rather, the melting point of the oil is modified. For example, the melting point is increased by adding oils that have a higher melting point and reducing the oils that have a lower melting point. Again, the resultant gum base is tested or a chewing gum is created from the base and the chew characteristics of the gum are tested.

If the gum base, or the chew characteristics of the gum, are still not satisfactory, then further modifications can be made to the percent of oil and/or the melting point of the oil in the gum base. As a further step, the melting point of the elastomer plasticizer in the wax-free base can be modified. It has been found that the melting point of the elastomer plasticizer in the gum base contributes to the chew characteristics. Utilizing these steps, one should be able to eliminate the wax from a gum base without compromising the chew characteristics.

If the gum base originally contains approximately 5% or greater wax content, then the initial step in the process is preferably to eliminate the wax and to increase the oil content proportionately. As previously stated, it is not necessary that the oils be increased in a proportion that corresponds exactly to the original wax content. Rather, the oils are at least increased so as to substantially make up for the elimination of the wax portion. The resultant gum base is then either tested or can then be used to create a chewing gum that is then compared to the control to determine its chew characteristics.

If the characteristics of the resultant gum base are not satisfactory, then the melting point of the oil is modified slightly. Again, to achieve an increase in the melting point in the oil, the oils having a higher melting point, for example, soybean, are increased and the oils having a lower melting point, for example, cotton-seed oil, are reduced.

The gum base is again tested. If it is found that the gum base does not provide satisfactory characteristics, then the melting point of the oil can be further modified.

As an alternative, the proportion of the oil contained in the base can be modified.

If a satisfactory chewing gum base is not created through the step of modifying the melting point of the oil, then the melting point of the elastomer plasticizer is modified.

By using this method, wax can be removed from a gum base that originally contains approximately 5% or greater wax and a wax free gum base can be created that can be used to make a chewing gum having chew characteristics as good as, if not better than, a gum created from a gum base containing wax.

By way of example, and not limitation, examples of wax containing gum bases (controls) are compared to no wax bases that were reformulated from the control formulas pursuant to the present invention will now be given:

I. CHEWING GUMS

-continued

EXAMPLES 75-90

| Type: | 75 | 76 | 77 Control |
|---|---|---|---|
| Elastomer | 18.5 | 18.5 | 15.5 |
| PVAc | 13.1 | 13.1 | 13.1 |
| Elastomer Plasticizer | 19.9 | 19.9 | 19.9 |
| Wax | — | — | 19.7 |
| Hyd. Veg. Oil | 13.8 | 13.8 | 6.3 |
| Softening Point | 57° C. | 57° C. | 80° C. |

| Type: | 78 | 79 Control | 80 | 81 Control |
|---|---|---|---|---|
| Elastomer | 11.7 | 11.7 | 12.3 | 12.6 |
| PVAc | 27.3 | 27.3 | 27.4 | 27.4 |
| Elastomer Plasticizer | 26.9 | 26.9 | 27.4 | 25.9 |
| Hyd. Veg. Oil | 14.3 | 2.0 | 12.3 | 3.2 |
| Wax | — | 13.3 | — | 12.4 |
| Softening Point | 56° C. | 70° C. | 60° C. | 73° C. |

| Type | 82 | 83 | 84 Control | 85 | 86 Control |
|---|---|---|---|---|---|
| Elastomer | 11.1 | 18.9 | 18.7 | 16.7 | 16.7 |
| PVAc | 27.4 | 21.3 | 21.5 | 15.3 | 15.2 |
| Elastomer Plasticizer | 27.4 | 9.7 | 9.6 | 19.0 | 19.1 |
| Hyd. Veg. Oil | 13.6 | 23.2 | 19.5 | 21.4 | 14.3 |
| Wax | — | — | 4.3 | — | 10.0 |
| Softening Point | 53° C. | 57° C. | 63° C. | 59° C. | 67° C. |

| Type: | 87 | 88 Control | 89 | 90 |
|---|---|---|---|---|
| Elastomer | 11.9 | 11.9 | 11.7 | 26.0 |
| PVAc | 27.5 | 27.6 | 27.3 | 21.7 |
| Elastomer Plasticizer | 25.3 | 25.3 | 26.9 | — |
| Wax | — | 14.4 | — | — |
| Hyd. Veg. Oil | 15.5 | 2.0 | 14.2 | 36.4 |
| Softening Point | 57° C. | 65° C. | 59° C. | 64° C. |

EXAMPLES 91-98

| Type: | 91 | 92 Control | 93 | 94 Control |
|---|---|---|---|---|
| Elastomer | 28.8 | 31.3 | 30.3 | 30.5 |
| PVAc | 22.0 | 22.4 | 15.5 | 15.6 |
| Elastomer Plasticizer | — | 13.7 | 15.2 | 14.7 |
| Hyd. Veg. Oil | 17.2 | 4.7 | 16.0 | 5.7 |
| Wax | — | 12.9 | — | 11.9 |
| Softening Point | 53° C. | 58° C. | 51° C. | 56° C. |

| Type: | 95 | 96 Control | 97 | 98 Control |
|---|---|---|---|---|
| Elastomer | 36.87 | 36.9 | 30.2 | 30.9 |
| PVAc | 26.64 | 26.6 | 15.4 | 15.7 |
| Elastomer Plasticizer | 11.41 | 11.4 | 15.2 | 13.3 |
| Hyd. Veg. Oil | 16.0 | 5.9 | 13.5 | 5.9 |
| Wax | — | 10.2 | — | 10.3 |
| Softening Point | 58° C. | 77° C. | 56° C. | 65° C. |

II. BUBBLE GUMS

EXAMPLES 99-105

| Type: | 99 | 100 Control | 101 | 102 Control |
|---|---|---|---|---|
| Elastomer | 7.9 | 7.0 | 11.9 | 10.8 |
| PVAc | 34.2 | 31.3 | 37.0 | 35.3 |
| Elastomer Plasticizer | 14.8 | 13.1 | 20.3 | 18.5 |
| Softener | 13.3 | 10.6 | 14.1 | 12.8 |
| Wax | — | 13.0 | — | 6.5 |
| Softening Point | 50° C. | 56° C. | 57° C. | 62° C. |

| Type: | 103 | 104 | 105 Control |
|---|---|---|---|
| Elastomer | 11.6 | 11.6 | 10.8 |
| PVAc | 31.4 | 31.4 | 31.3 |
| Elastomer Plasticizer | 19.8 | 19.8 | 18.5 |
| Softener | 13.7 | 14.5 | 12.3 |
| Wax | — | — | 6.5 |
| Softening Point | 53° C. | 53° C. | 59° C. |

It has been found that with at least some current commercial bases, the wax can be removed without compromising the chew characteristics of a resultant gum product by, at least in part, increasing the oils and creating a base having a softening point that is lower than the softening point of a corresponding wax containing gum base. Preferably, the no wax gum base has a softening point that is at least 5° C. lower than the gum base if it had included wax. In a preferred embodiment, the softening point is 10° C. lower.

By way of example, and not limitation, taste results of gum created from commercial gum bases that have wax vis-a-vis chewing gum, created from gum bases that do not include wax pursuant to the present invention will now be given.

The testing was performed using a blind study protocol. One hundred fifty participants were used in each of the three studies. Fifty percent of the participants in each study had chewed the commercial (control) product as their regular preferred gum before the study and 50% of the participants had chewed the control gum at least once during the preceding week before the study.

During the study, each participant was given one of the two gum products to chew for 12 minutes. This was followed by a cleansing period of 6 minutes. The second product was then chewed for 12 minutes. During the study, half of the participants were given the control first and half the new product. The participants were asked for their preferences based on a number of criteria.

The results were as follows:

EXAMPLE NO. 1A

In this example, the control chewing gum comprised: 25.2% of a gum base with wax; 48.45% sorbitol; 16.80% glycerine; 8.01 mannitol; 1.33% flavor; and 0.21% encapsulated aspartame.

The no wax chewing gum comprised: 25.2% of the gum base of the control modified pursuant to the present invention; 48.45% sorbitol; 16.80% glycerine; 8.01% mannitol; 1.33% flavor; and 0.21% encapsulated aspartame.

| PREFERENCES | | |
|---|---|---|
| | Prefer No Wax % | Prefer Wax % |
| Overall Preference | 52 | 47 |
| Tastes Best | 52 | 46 |
| More Refreshing | 50 | 46 |
| Chewing Texture | 50 | 47 |
| Refreshing Breath | 55 | 40 |
| Long Lasting Taste | 52 | 41 |
| Better Spearmint Flavor | 49 | 48 |
| Better Appearance | 36 | 44 |
| Sweeter | 54 | 40 |
| Less Bitter | 44 | 45 |
| Softer | 79 | 16 |
| Better Smell | 38 | 51 |
| Stronger Flavor | 57 | 42 |
| Stuck More To Teeth | 31 | 31 |
| Rather Buy | 52 | 44 |

| FLAVOR OVERALL (1 MINUTE) | | |
|---|---|---|
| | No Wax | Wax |
| "Excellent" | 23% | 21% |

| STRENGTH OF FLAVOR (1 MINUTE) | | |
|---|---|---|
| | No Wax | Wax |
| "About Right" | 70% | 70% |

| FLAVOR OVERALL (12 MINUTES) | | |
|---|---|---|
| | No Wax | Wax |
| "Excellent" | 9% | 7% |

-continued

| STRENGTH OF FLAVOR (12 MINUTES) | | |
|---|---|---|
| | No Wax | Wax |
| "About Right" | 51% | 56% |

EXAMPLE NO. 2A

In this example, the control chewing gum comprised: 25.16% base with wax; 48.38% sorbitol; 8.00% mannitol; 16.66% glycerine; 1.55% flavor; and 0.25% encapsulated aspartame.

The no wax chewing gum comprised: 25.16% of the base of the control modified pursuant to the present invention; 48.28% sorbitol; 8.00% mannitol; 16.66% glycerine; 1.65% flavor; and 0.25% encapsulated aspartame.

| PREFERENCES | | |
|---|---|---|
| | Prefer No Wax % | Prefer Wax % |
| Overall Preference | 49 | 47 |
| Tastes Best | 47 | 50 |
| More Refreshing | 49 | 46 |
| Chewing Texture | 46 | 51 |
| Refreshing Breath | 46 | 48 |
| Long Lasting Taste | 47 | 49 |
| Better Spearmint Flavor | 50 | 46 |
| Better Appearance | 39 | 39 |
| Sweeter | 44 | 47 |
| Less Bitter | 37 | 47 |
| Softer | 72 | 24 |
| Better Smell | 50 | 43 |
| Stronger Flavor | 53 | 44 |
| Stuck More To Teeth | 13 | 37 |
| Rather Buy | 48 | 48 |

| FLAVOR OVERALL (1 MINUTE) | | |
|---|---|---|
| | No Wax | Wax |
| "Excellent" | 22% | 17% |

| STRENGTH OF FLAVOR (1 MINUTE) | | |
|---|---|---|
| | No Wax | Wax |
| "About Right" | 64% | 65% |

| FLAVOR OVERALL (12 MINUTES) | | |
|---|---|---|
| | No Wax | Wax |
| "Excellent" | 11% | 7% |

| STRENGTH OF FLAVOR (12 MINUTES) | | |
|---|---|---|
| | No Wax | Wax |
| "About Right" | 48% | 47% |

EXAMPLE No. 3A

In this example, the control comprised: 20.6% base with wax; 57.63% sugar; 20.39% corn syrup; 0.83% glycerine; and 0.55% flavor. The no wax chewing gum comprised: 20.6% of the base of the control modified pursuant to the invention; 59.49% sugar; 18.5% corn syrup; 0.83% glycerine; and 0.58% flavor.

| PREFERENCES | | |
|---|---|---|
| | Prefer No Wax % | Prefer Wax % |
| Overall Preference | 56 | 43 |
| Tastes Best | 53 | 44 |
| More Refreshing | 51 | 48 |
| Chewing Texture | 48 | 48 |
| Refreshing Breath | 51 | 45 |
| Long Lasting Taste | 50 | 46 |
| Better Spearmint Flavor | 46 | 51 |
| Better Appearance | 45 | 38 |
| Sweeter | 40 | 55 |
| Less Bitter | 46 | 43 |
| Softer | 43 | 52 |
| Better Smell | 46 | 45 |
| Stronger Flavor | 46 | 52 |
| Stuck More To Teeth | 26 | 32 |
| Rather Buy | 51 | 45 |

EXAMPLE NO. 3A

| FLAVOR OVERALL (1 MINUTE) | | |
|---|---|---|
| | No Wax | Wax |
| "Excellent" | 21% | 21% |

| STRENGTH OF FLAVOR (1 MINUTE) | | |
|---|---|---|
| | No Wax | Wax |
| "About Right" | 71% | 68% |

| FLAVOR OVERALL (12 MINUTES) | | |
|---|---|---|
| | No Wax | Wax |
| "Excellent" | 7% | 6% |

| STRENGTH OF FLAVOR (12 MINUTES) | | |
|---|---|---|
| | No Wax | Wax |
| "About Right" | 45% | 38% |

While the embodiments of the invention disclosed herein are presently considered to be preferred, various modifications and improvement can be made without departing from the spirit and scope of the invention. The scope of the invention is indicated in the appended claims, and all changes that come within the meaning and range of equivalency of the claims are intended to be embraced therein.

I claim:

1. A wax-free chewing gum base having flavor release characteristics at least as good as similar bases including wax comprising:
    an elastomer;
    polyvinyl acetate;
    an elastomer plasticizer; and
    a sufficient amount of oil having a capillary melting point between 40° C. and 70° C. to achieve flavor release characteristics that are at least as good as a similar gum base that includes wax.

2. The wax-free chewing gum base of claim 1 wherein at least a majority of the oil is hydrogenated.

3. The wax-free chewing base of claim 1 wherein the oil has a capillary melting point between approximately 60° C. and 70° C.

4. The wax-free chewing gum base of claim 1 comprising at least 12% oil.

5. The wax-free chewing gum base of claim 1 comprising:
    about 20 to about 60 weight percent synthetic elastomer;
    0 to about 30 weight percent natural elastomer;
    about 5 to about 55 weight percent elastomer plasticizer;
    about 4 to about 35 weight percent filler;
    about 12 to about 35 weight percent softener.

6. The wax-free chewing gum base of claim 1 wherein the elastomer includes at least one natural elastomer selected from the group consisting of jelutong, lechi caspi, perillo, sorva, massaranduba balata, massaranduba chocolate, nispero, rosindinha, chicle, gutta hang kang, smoked or liquid latex, guayule, and combinations thereof.

7. The wax-free chewing gum base of claim 1 wherein the elastomer includes at least one synthetic elastomer selected from the group consisting of polyisobutylene, butadiene-styrene copolymer, vinyl acetate-vinyl laurate copolymer, polyisoprene, isobutylene-isoprene copolymer, and combinations thereof.

8. The wax-free chewing gum base of claim 1 wherein the elastomer plasticizer is selected from the group consisting of glycerol esters of rosin, glycerol esters of partially hydrogenated rosin, glycerol esters of polymerized rosin, glycerol esters of partially dimerized rosin, partially hydrogenated methyl esters of rosin, pentaerythritol esters of rosin, methyl esters of rosin, pentaerythritol esters of partially hydrogenated rosin, terpene resin, and combinations thereof.

9. The wax-free chewing gum base of claim 1 including a filler selected from the group consisting of calcium carbonate, magnesium carbonate, talc, ground limestone, magnesium silicate, aluminum silicate, clay, alumina, titanium dioxide, mono-, di- and tri-calcium phosphates, cellulose, and combinations thereof.

10. A wax-free chewing gum having chew characteristics at least substantially as good as a similar chewing gum including wax comprising:
a water soluble bulk agent;
one or more flavoring agents;
a water insoluble gum base comprising: an elastomer; an elastomer plasticizer; polyvinyl acetate; and a softener wherein the softening point of the gum base is at least 5° C. less than a similar gum base having wax.

11. The chewing gum of claim 10 wherein the softener is chosen from the group consisting of cottonseed, soybean, canola, safflower, sunflower, palm, and coconut oil.

12. The chewing gum of claim 10 wherein the elastomer includes natural rubber.

13. The chewing gum of claim 10 wherein the softener includes a hydrogenated oil having a capillary melting point between approximately 60° C. and 70° C.

14. The chewing gum of claim 10 wherein the base includes a sufficient amount of a hydrogenated oil to reduce the softening point by at least 5° C. as compared to a similar gum base having wax.

15. The chewing gum of claim 10 wherein the base includes, at most, approximately 10% by weight, with respect to the entire base, a partially hydrogenated oil.

16. A method for creating a wax-free gum base for creating a gum having chew characteristics at least substantially similar to a gum created from a wax containing gum base comprising the steps of:
creating a gum base from at least an elastomer, an elastomer plasticizer, polyvinyl acetate, and oil; and
choosing the percent and type of oil so as to create a gum base having a softening point that is lower than the softening point of the gum base had wax been present.

17. The method of claim 16 wherein the softening point of the no-wax base is at least 5° C. lower.

18. A method for creating a wax-free gum base for creating a gum having chew characteristics at least substantially similar to a gum created from a wax containing gum base comprising the steps of:
creating a gum base from at least an elastomer, an elastomer plasticizer, polyvinyl acetate, and a softener; and
choosing the percent and type of at least the softener or the elastomer plasticizer to create a gum base having characteristics substantially similar to a similar gum base including wax.

19. A method for eliminating wax from a gum base formula that initially uses approximately 5% or less by weight wax and includes at least an elastomer, polyvinyl acetate, an elastomer solvent, and oil comprising the steps of:
a) eliminating wax from the formula and increasing at least a majority of the remaining components approximately proportionately;
b) testing a resultant gum base; and
c) if the characteristics of the resultant gum base are not satisfactory, modifying the oil ratios or content of the gum base.

20. The method of claim 19 wherein the oil content is modified by increasing the oil content in the gum base.

21. The method of claim 19 wherein the oil ratios in the gum base are modified by selecting oils of different capillary melting points.

22. The method of claim 19 wherein the gum base is tested by formulating a chewing gum and testing same to determine if the chew characteristics are satisfactory.

23. The method of claim 19 including the steps of:
testing a resultant gum base from step c) and if the characteristics are not satisfactory, modifying the elastomer plasticizer ratios or content of the gum base.

24. The method of claim 23 wherein the elastomer plasticizer ratios are modified by selecting elastomer plasticizers of different ring and ball softening points.

25. A method for eliminating wax from a gum base formula comprising approximately 5% or more wax by weight and including at least an elastomer polyvinyl acetate, elastomer solvent, and an oil comprising the steps of:
a) eliminating wax from the formula and increasing approximately proportionately the content of the oil in the base;
b) testing a resultant base; and
c) if the characteristics of the resultant base are not satisfactory, modifying the oil content of the resultant gum base.

26. The method of claim 25 wherein the oil content is modified by changing the oil content in the gum base.

27. The method of claim 25 wherein the oil ratios in the gum base are modified by selecting oils of different capillary melting points.

28. The method of claim 25 wherein the gum base is tested by formulating a chewing gum and testing same to determine if the chew characteristics are satisfactory.

29. The method of claim 25 including the steps of:
testing a resultant base of step c) and if the characteristics are not satisfactory, modifying the elastomer plasticizer content or ratios of the gum base.

30. The method of claim 29 wherein the elastomer plasticizer ratios are modified by selecting elastomer plasticizers of different ring and ball softening points.

* * * * *